United States Patent
Dean et al.

(10) Patent No.: US 10,108,210 B1
(45) Date of Patent: Oct. 23, 2018

(54) DIGITAL HIGH VOLTAGE POWER SUPPLY

(71) Applicants: Craig Sean Dean, Dallas, TX (US); Lynn Edward Roszel, Wylie, TX (US); Scott Richard Wilson, Coram, NY (US); Erik Steven Haugarth, Plano, TX (US); Jan Simon Reuning, The Colony, TX (US)

(72) Inventors: Craig Sean Dean, Dallas, TX (US); Lynn Edward Roszel, Wylie, TX (US); Scott Richard Wilson, Coram, NY (US); Erik Steven Haugarth, Plano, TX (US); Jan Simon Reuning, The Colony, TX (US)

(73) Assignee: Dean Technology, Inc., Addison, TX (US)

( * ) Notice: Subject to any disclaimer, the term of this patent is extended or adjusted under 35 U.S.C. 154(b) by 0 days.

(21) Appl. No.: 15/893,135

(22) Filed: Feb. 9, 2018

Related U.S. Application Data

(60) Provisional application No. 62/608,018, filed on Dec. 20, 2017, provisional application No. 62/608,016, filed on Dec. 20, 2017.

(51) Int. Cl.
| | | |
|---|---|---|
| G05F 1/45 | (2006.01) |
| G05F 1/46 | (2006.01) |
| G05B 15/02 | (2006.01) |
| H02M 1/14 | (2006.01) |
| H02M 3/00 | (2006.01) |

(52) U.S. Cl.
CPC .............. G05F 1/46 (2013.01); G05B 15/02 (2013.01); H02M 1/14 (2013.01); H02M 3/00 (2013.01)

(58) Field of Classification Search
CPC ............ G05F 1/46; G05F 1/467; H02M 1/14; H02M 1/15; H02M 3/156; H02M 3/158; G05B 15/00; G05B 15/02
See application file for complete search history.

(56) References Cited

U.S. PATENT DOCUMENTS

| | | | |
|---|---|---|---|
| 7,622,894 B2 * | 11/2009 | Kawahara .......... | G01R 31/3624 320/127 |
| 2012/0021695 A1 * | 1/2012 | Murji ................... | H03G 3/004 455/73 |
| 2014/0006834 A1 * | 1/2014 | Ishii ........................ | G06F 1/30 713/340 |

* cited by examiner

*Primary Examiner* — Matthew Nguyen
(74) *Attorney, Agent, or Firm* — Buskop Law Group, P.C.; Wendy Buskop

(57) ABSTRACT

A digital high voltage power having a plurality of filters, a high voltage divider, and a processor with memory. The memory contains operating set points. The processor is configured to receive scaled voltage feedback signals from the high voltage divider, compare the scaled voltage feedback signals to the plurality of operating set points in memory, compute and store revised operating set points using the compared scaled voltage feedback signal, use the revised operating set points to simultaneously and automatically regulate output voltage to be within all operating set points, and generate an alert when output conditions exceed any operating set points.

15 Claims, 2 Drawing Sheets

DIGITAL HIGH VOLTAGE POWER SUPPLY

The present application claims priority to and the benefit of U.S. Provisional Patent Application Ser. No. 62/608,016 filed on Dec. 20, 2017, entitled "DIGITAL CONTROLLED HIGH VOLTAGE POWER SUPPLY" and U.S. Provisional Patent Application Ser. No. 62/608,018 filed on Dec. 20, 2017, entitled "MULTI-CONTROLLABLE HIGH VOLTAGE POWER SUPPLY SYSTEM". These references are hereby incorporated in its entirety.

FIELD

The present embodiment generally relates to digital high voltage power supply.

BACKGROUND

A need exists for a digital power supply with improved performance and reduced cost compared to traditional analog counterparts.

The present embodiments meet these needs.

BRIEF DESCRIPTION OF THE DRAWINGS

The detailed description will be better understood in conjunction with the accompanying drawings as follows.

Figure 1:
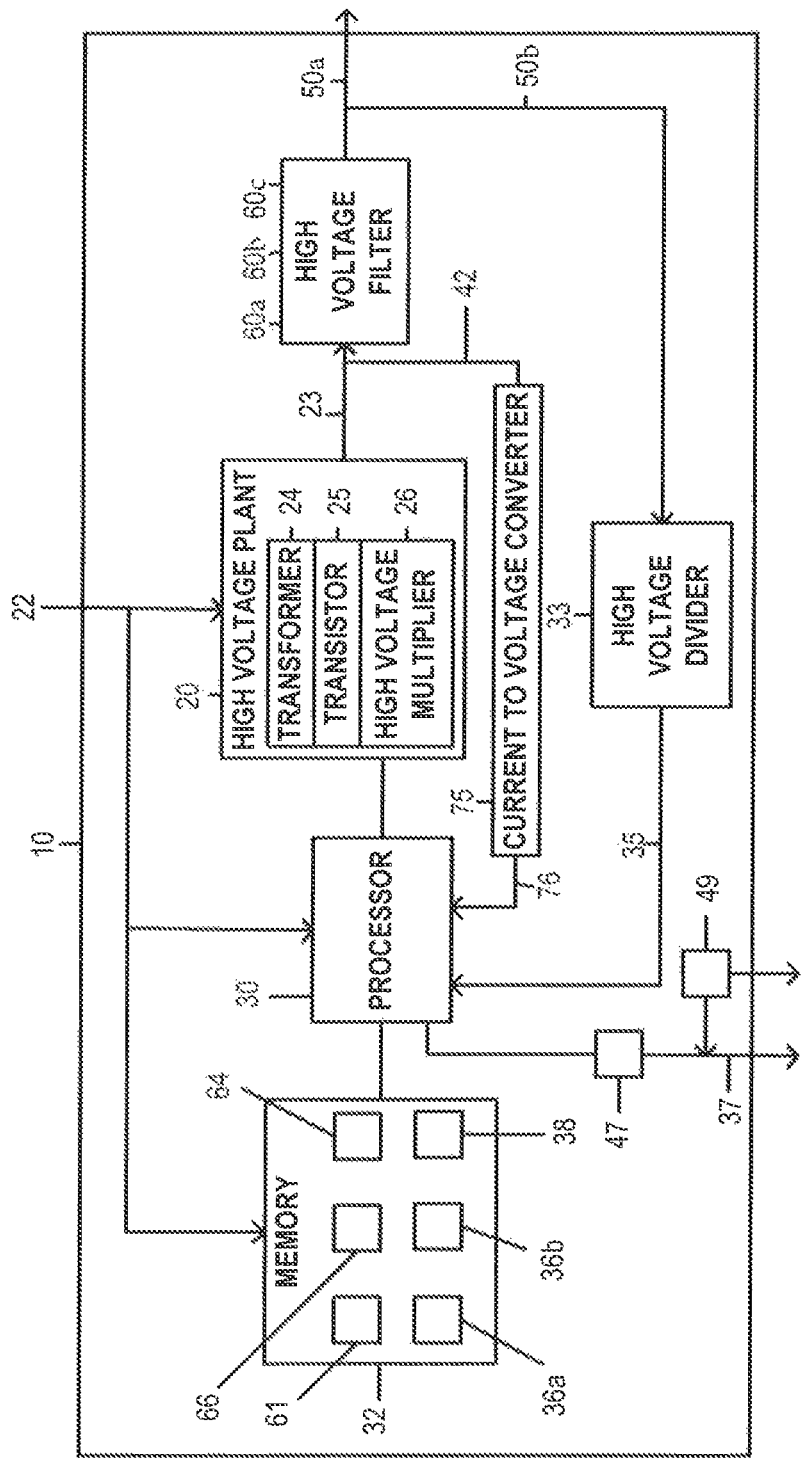
FIG. 1 depicts an overview of the digital high voltage power supply according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present invention related to a digital high voltage power supply.

The digital high voltage power supply has a high voltage plant configured to receive a low voltage and generate a high voltage signal containing unwanted sinusoidal noise, the high voltage plant comprising at least one of: a transformer, a transistor, and a high voltage multiplier.

The digital high voltage power supply has a plurality of filters, wherein at least one filter is connected to the high voltage plant. The at least one filter forms a high voltage output.

The digital high voltage power supply has a high voltage divider to receive the high voltage output and generate a scaled voltage feedback signal.

The digital high voltage power supply has a processor with memory containing a plurality of operating set points. The processor is connected to the low voltage and the high voltage plant.

The processor is configured to: receive the scaled voltage feedback signal from the high voltage divider; compare the scaled voltage feedback signal to the plurality of operating set points in the memory; compute, store, revised operating set points using the compared scaled voltage feedback signal; use the revised operating set points to simultaneously and automatically regulate output voltage to be within all operating set points; and generate an alert as output signals when output conditions exceed any operating set points.

The digital high voltage power supply can prevent injury and casualties near a power supply by preventing spikes in the power supply, exceeding human endurance.

The digital high voltage power supply provides a clear feedback signal that reduces noise in the power supply. The digital high voltage power supply causes shut down of the power supply quickly and accurately to prevent fires and explosions in the event of a fault or explosive over-current condition due to high voltage.

In embodiments, the digital high voltage power supply has a digitally compensated circuit that can provide clean and accurate output. The digital high voltage power supply provides a stable power source for clear and accurate medical imaging applications, which can allow for early diagnosis of illness and medical conditions.

The digital high voltage power supply can provide a smaller sized power supply. The small size power supply enables the size and weight of medical equipment to be reduced. The small size power supply can be used in the case of natural disasters or man-made disasters.

In embodiments, the digital high voltage power supply can provide a stable power source for equipment that detects contraband. This stable and reliable long life power source can be used by the TSA and the National Security Administration to detect threats to national security.

The digital high voltage power supply can allow for a wider variable input voltage range so that a single machine can be deployed and relocated into many geographical areas. The digital high voltage power supply provides many voltages with a single lightweight, portable, transportable digital high voltage power supply. For instance, the power supply can be from 0.5 pounds to 10 pounds. The digital high voltage power supply enables multiple locations to be served sequentially without needing specially built machines for each location.

The digital high voltage power supply can be used for portable X-ray units to provide quick relief to devastated areas.

The following definitions are used herein:

The term "alert" can refer to a signal that specifies when a specific condition is met. For example, an alert can be an LED emitting light when the input voltage exceeds a high output voltage limit.

The term "communication protocol or discrete I/O signals" can refer to a signal or group of signal that are used to interact with the high voltage power supply. For example, the communication protocol can be a signal received from a feedback signal from a voltage divider or communications from a computer to turn the high voltage output on or off.

The term "digital high voltage power supply" can refer to a high voltage power supply in which digital technology is used within the feedback loop for control of the high voltage power supply. For example, a digital high voltage power supply can increase or decrease the high voltage output using an analog set point and prevent the system from undesired voltage variations in excess of 1 percent.

The term "filters" can refer to a device or substance that passes electric current of certain frequencies or frequency ranges while preventing the passage of other current at different frequencies or different frequency ranges. For example, a filter can be a device that removes white noise from a signal or removes small voltage variations from a sine wave.

The term "high voltage" describes a variable voltage platform with from 125 volts to 1 million volts allowing a user to select any of those voltages between 125 volts and 1 million volts on one platform, or have any one of those voltages in a separate voltage platform.

The term "high voltage divider" can refer to a passive linear circuit that produces an output voltage that is a fraction of the high voltage divider's input voltage. For example, a high voltage divider takes a high voltage and divides the high voltage, 6000 volts to a low voltage 3.3 volts that can be used by the high voltage power supply based on an analog set point or on a digital set point.

The term "high voltage multiplier" can refer to an arrangement of capacitors and rectifier diodes that is frequently used to generate high DC voltages. For example, high voltage multiplier can be a Cockcroft-Walton™ three stage series multiplier.

The term "high voltage output" is an electrical potential large enough to cause injury or damage to humans, wildlife, livestock or objects. Even though low voltage is incoming to the inventive power supply, the power supply can create a high voltage output. "High voltage output" can range from 100 Vdc up to 1,000,000 Vdc. The output voltage can be provided through a pin, cable, or a connector.

The term "high voltage plant" can refer to an arrangement of capacitors diodes and or transformers which in combination, produce high voltage. One example could be a high voltage transformer with a diode and a capacitor that produces 500 Vdc.

The term "low voltage" can refer to a voltage less then 100 Vdc. For example, a low voltage can be 24 Vdc for the input of the high voltage power supply or 3.3 Vdc for the scaled voltage feedback signal.

The term "memory" non-transitory computer readable medium, such as a solid state memory, and the like in communication with the processor.

The term "non-transitory computer readable medium" excludes any transitory signals but includes any non-transitory data storage circuitry, e.g., buffers, and cache, and wherein the non-transitory computer readable medium does not erase when power is removed from the device or the device is shut down.

The term "operating set points" can refer to the point at which the user wishes to operate. For example, the operating high voltage set-point can be set to 3000 V by the operator and the high voltage power supply will produce 3000 V.

The term "preset startup" can refer to a factory or user programmed start up condition. The power supply will power up and go to the exact factory programmed voltage set point for the high voltage output. This high voltage output can be anywhere from 0.001 percent to 100 percent of the power supply's capable output voltage.

The term "processor" refers to a computer, a field programmable gate array (FPGA), a complex programmable logic devices (CPLD) or a cloud based computing system. For example the processor can be a microprocessor.

The term "revised operating set points" can refer to the operating point that is set by the power supply based on an error calculation. If the operating set-point is set to 3000V but the power supply produces 3010 V the revised operating set-point from the power supply will then revise the operating set-point so that the output voltage will be 3000 V.

The term "scaled voltage feedback signal" can refer to the signal coming from a high voltage divider. The high voltage signal is scaled to a smaller workable voltage like 3.3 Vdc. The high voltage power supply can now use this signal to make adjustments.

The term "transformer," can refer to an electrical device consisting essentially of two or more windings wound on a single core, which by electromagnetic induction transforms electric energy from one set of one or more circuits, to another set of one or more circuits, such that the frequency of the energy remains unchanged and constant, while the voltage and current usually change. For example, the transformer on the high voltage power supply can convert 24 Vac to 1200 Vac.

The term "transistor' can refer to a device that regulates current or voltage flow and acts as a switch or gate for electronic signals. For example, a transistor can be a metal oxide field effect transistor (MOSFET) that operates as an "on off" power switch.

Now turning to the Figures, FIG. 1 depicts an overview of the digital high voltage power supply 10.

The digital high voltage power supply 10 has a high voltage plant 20.

The high voltage plant 20 can be configured to receive a low voltage 22 and generate a high voltage signal containing unwanted sinusoidal noise 23.

The voltage plant 20 can have at least one of: a transformer 24, a transistor 25, and a high voltage multiplier 26.

In embodiments, the voltage plant 20 can have one transformer 24 connected to a transistor 25. In embodiments the voltage plant could have a plurality of transformers connected to a plurality of transistors, each pair connected in series and/or in parallel.

In embodiments, the voltage plant 20 can have a transformer 24 connected to a high voltage multiplier 26. In embodiments, the voltage plant can have a plurality of transformers connected to a plurality of high voltage multipliers, each pair connected in series and/or parallel.

In embodiments, the voltage plant 20 can have a transistor 25 connected to a transformer 24 connected to a high voltage multiplier 26. The set of transistor, transformer and high voltage multiplier can be connected in series or in parallel.

Multiples of transistors, transformers and high voltage multipliers can be used in embodiments. Each set of transistor, transformer and high voltage multiplier can be connected in series or in parallel to another set.

The digital high voltage power supply 10 has a plurality of filters 60a-60c, wherein at least one filter 60a-60c is connected to the high voltage plant 20.

In embodiments, at least one filter 60a can form a first high voltage output 50a and a second high voltage output 50b. In embodiments, a single high voltage output can be created.

In an embodiment, the first filter, 60a can be an inductive resistance capacitor filter "LRC filter" and connected in series to a second filter 60b that can be a resistance capacitor "RC" filter further connected in series to a third filter 60c, that can be another a RC resistance capacitance filter identical or different values from the second filter 60b.

The third filter, or last filter if only one, two or more than three are used, provides the high voltage output.

The high voltage output can be 4500 volts as the output.

A high voltage divider 33 can receive the high voltage output 50a and 50b and generate a scaled voltage feedback signal 35.

For example, the high voltage divider can receive a high voltage output of 1500 Vdc and generate a scaled voltage feedback signal 35 of 2 Vdc.

The digital high voltage power supply 10 can contain a processor 30 for example a microprocessor.

The processor 30 has memory 32 that can contain a plurality of operating set points 36, such as 3000 bit operating set points.

In embodiments, the processor 30 can be connected to the low voltage 22 and the high voltage plant 20.

The processor 30 can be configured to: receive the scaled voltage feedback signal 35 from the high voltage divider 33, compare the scaled voltage feedback signal 35 to the plurality of operating set points 36a-36b in the memory, compute and store, at least one revised operating set point 38 using the compared scaled voltage feedback signal 35, use the revised operating set point(s) 38 to simultaneously and automatically regulate high voltage output 50 to be within all operating set points; and generate an alert 37 when output conditions exceed any operating set points.

The operating set points are variable, based on user defined parameters.

In embodiments, at least one of the preset set points and the operating set points can be analog, digital or both analog and digital set points.

In embodiments, simultaneously, the alert 37 can be automatically transmitted through a communication protocol 47 or discrete I/O signals 49.

As an example, a usable communication protocol can be RS-232.

In embodiments, a ripple and digital hunting mitigation 61 can be located in the memory 32. An example of a ripple and digital hunting mitigation 61 is a known continuous frequency sine wave which needs to be removed from the output signal.

In embodiments, the memory 32 can contain a first preset value 64 for adjusting a speed at which the output voltage reaches an operating set point after output is enabled of the high voltage power supply and a second preset value 66 in memory for adjusting a speed at which the output voltage is adjusted due to changing current load conditions.

A second feedback loop 42 can be connected to a current to voltage converter 75 providing another feedback signal 76 to the processor 30. The feedback signal 76 is used to adjust a revised operating set point 38 in memory. The feedback signal 76 does not exceed one of the operating set points 36a-36b. As an example, a current to voltage converter can be a properly configured operational amplifier such as those available from Texas Instruments®.

In embodiments, the alert 37 can contain a plurality of communication signals, all operating simultaneously to convey different commands and data.

In embodiments, a preset value can adjust the speed at which the output voltage reaches an operating set point after output is enabled of the high voltage power supply and a speed at which the output voltage is adjusted due to changing load conditions.

Figure 2:
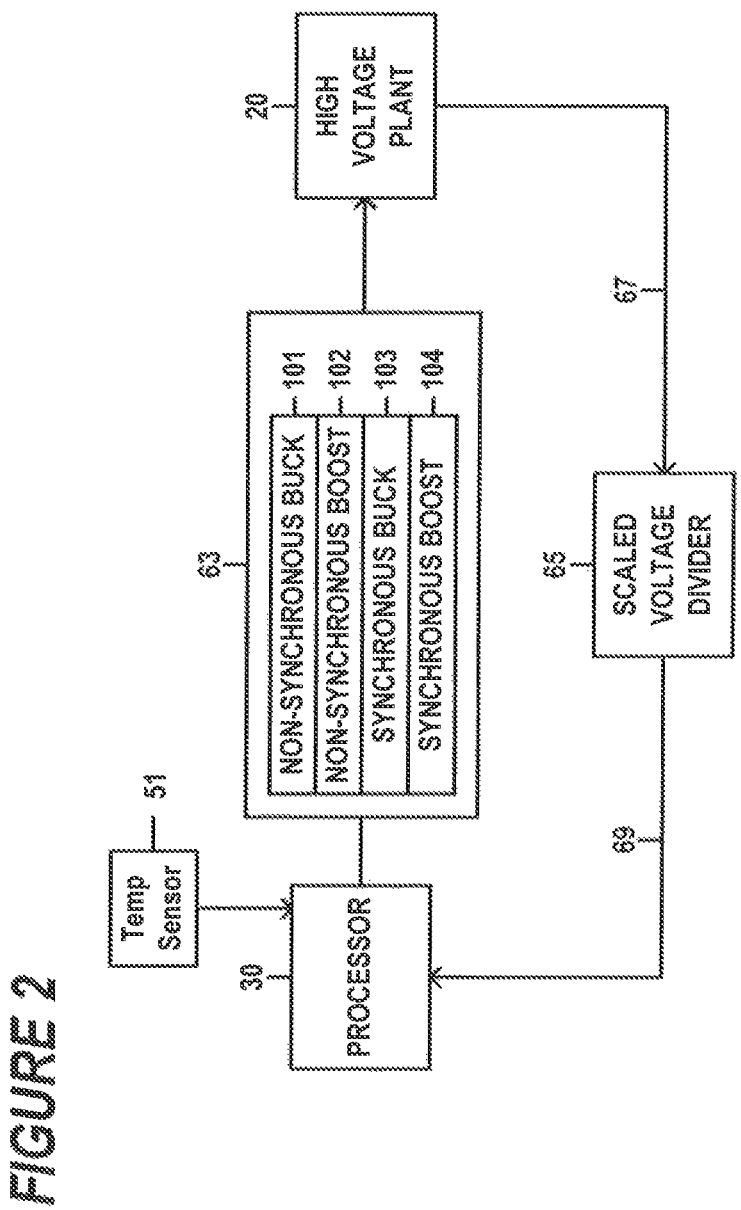
FIG. 2 depicts a second power supply according to one or more embodiments.

FIG. 2 depicts a second power supply 63 electrically connected between the processor 30 and the high voltage plant 20.

A temperature sensor 51 can be connected to the processor. The temperature sensor is used to detect temperature around components of the power supply.

A voltage divider 65 can be configured to receive a second voltage output 67 from the high voltage plant, and generate a second scaled voltage feedback signal 69.

For example, if the first voltage output 67 is 2000 Vdc, the second scaled voltage feedback signal 69 can be 10 Vdc, as generated by the voltage divider 65.

In embodiments, a non-synchronous buck 101, a non-synchronous boost 102, a synchronous buck 103, or a synchronous boost 104 can each operate as the second power supply 63.

For example, a non-synchronous buck 101 in the power supply can be a voltage converter that converts a voltage from 24 Vdc to 19 Vdc.

For example a non-synchronous boost 102 in the power supply can be can be a voltage converter that converts a voltage from 24 Vde to 36 Vdc.

For example a synchronous buck 103 usable in the power supply can be a voltage converter that converts a voltage from 29 Vdc to 15 Vdc.

For example, a synchronous boost 104 usable in the power system can be a voltage convert that converts a voltage from 12 Vdc to 28 Vdc.

Three different examples of the power system follow:

Example 1: Digital High Voltage Power Supply with a Plastic Case

In embodiments, the digital high voltage power supply is contained in a plastic case that is sealed. The digital high voltage power can weigh V2 to 2 pounds.

A high voltage plant is in the case that can be attached to the case, such as with epoxy. The high voltage plant in this example receive a low voltage such as 12 volts DC.

The high voltage plant converts the 12 volts to a high voltage signal such as 1000 Vac containing unwanted sinusoidal noise such as a 6 Vac signal which is like static on a phone call.

The high voltage plant can contain a transformer that converts the 12 volts to the 1000 volts or a voltage step up device, which does the same voltage conversion, but differently.

The high voltage plant contains a transistor such as a MOSFET transistor which pulls the low voltage 12 volts current through the transformer and creates a magnetic field that controls the passage of the voltage like a water valve connected to a water pipe.

The high voltage plant contains a high voltage multiplier such as a 6 times multiplier which multiplies the voltage from the transformer to the high voltage signal which is 6 times the transformer voltage. An example of a high voltage plant can be a standard series multiplier made by Dean Technology of Addison, Tex.

In this example, two filters are used. A first filter connects to the high voltage plant and the second filter connects to the high voltage plant in series with the first filter.

The second filter forms a high voltage output.

The first filter in this example can be a combination of an inductor, such as a 10 microhenry inductor, and a capacitor such as a 1 microfarad capacitor connected together in parallel to each other with a ground.

The second filter can be a combination of a resistor in series with the first filter and a capacitor connected with a ground. The resistor can be a 10 kilo ohm resistor. The capacitor in the second filter can be a 2 microfarad capacitor.

The high voltage divider is in case and electrically connected between the high voltage signal and produces a scaled voltage feedback signal. The high voltage divider is formed from a plurality of resistors connected in series. The high voltage divider can use different size resistors, such as one 10 giga ohm resistor and one 10 kilo ohm resistor.

The high voltage divider is configured to receive the high voltage output of 1000 volts and generate a scaled voltage feedback signal of 3 volts DC.

A processor, such as a microprocessor with programmable peripherals, and various hardware features and memory.

The memory for this example contains 4096 operating set points. Some of the step points are a specific voltage or current that the power supply can be set to for operation. Other set points are time intervals, or restart intervals, shut down lengths of time. For example, a specific voltage can be changed from 2000 volts to 5000 volts by entering a user defined value into the memory of the processor.

An example of a time interval set point can be stay on for 5 minutes.

An example of a restart interval can be attempt to restart every one second.

An example of shutdown lengths of time can be stay off for 5 seconds.

The processor is connected to the low voltage and the high voltage plant.

The processor is configured to: receive the scaled voltage feedback signal from the high voltage divider; compare the scaled voltage feedback signal to the plurality of operating set points in memory; compute and store in memory, at least one revised operating set point using the compared scaled voltage feedback signal.

For example, the processor computes at least one revised operating set point of a higher or lower voltage depending on the needs of the customer, such as a computation of 4000 volts or 1000 volts, like and A-D value of 2000 or 4096.

The processor uses the revised operating set point to simultaneously and automatically regulate high output voltage within all operating set points.

Example 2: Digital High Voltage Power Supply with Open Board

In an embodiment the digital high voltage power supply is contained in an open board that is sealed. The digital high voltage power can weigh 1 to 2 pounds.

In the case is a high voltage plant that can be attached to the case, such as with epoxy. The high voltage plant in this example, receives a low voltage such as 12 volts DC.

The high voltage plant converts the 12 volts to a high voltage signal such as 1000 volts DC containing unwanted sinusoidal noise, such as a 6 volt AC signal which is like static on a phone call.

The high voltage plant contains a transformer such as transform that converts the 12 volts to the 1000 volts or a voltage step up device can be used which does the same voltage conversion, but differently.

The high voltage plant contains a transistor such as a MOSFET transistor which pulls the low voltage 12 volts current through the transformer and creates a magnetic field that controls the passage of the voltage like a water valve connected to a water pipe.

The high voltage plant contains a high voltage multiplier such as a 6 times multiplier which multiplies the voltage from the transformer to the high voltage signal which is 6 times the transformer voltage. An example of a high voltage plant can be a standard series multiplier made by Dean Technology of Addison, Tex.

In this example, two filters are used. A first filter connects to the high voltage plant and the second filter connects to the high voltage plant in series with the first filter.

The second filter forms a high voltage output.

The first filter in this example can be a combination of an inductor, such as a 10 microhenry inductor, and a capacitor such as a 1 microfarad capacitor connected together in parallel to each other with a ground.

The second filter can be a combination of a resistor in series with the first filter and a capacitor connected with a ground. The resistor can be a 10 kilo ohm resistor. The capacitor in the second filter can be a 2 microfarad capacitor.

The high voltage divider is in case and electrically connected between the high voltage signal and produces a scaled voltage feedback signal. The high voltage divider is formed from a plurality of resistors connected in series. The high voltage divider can use different size resistors, such as one 10 giga ohm resistor and one 10 kilo ohm resistor.

The high voltage divider is configured to receive the high voltage output of 1000 volts and generate a scaled voltage feedback signal of 3 Vdc.

A processor, such as a microprocessor with programmable peripherals, and various hardware features and memory.

The memory for this example contains 4096 operating set points. Some of the set points are a specific voltage or current that the power supply can be set to for operation. Other set points are time intervals, or restart intervals, shut down lengths of time. For example, a specific voltage can be changed from 2000 volts to 5000 volts by entering a user defined value into the memory of the processor.

An example of a time interval set point can be stay on for 5 minutes.

An example of restart intervals can be attempt to restart every one second.

An example of a shut down lengths of time can be stay off for 5 seconds.

The processor is connected to the low voltage and the high voltage plant.

The processor is configured to: receive the scaled voltage feedback signal from the high voltage divider; compare the scaled voltage feedback signal to the plurality of operating set points in memory; compute and store in memory, at least one revised operating set point using the compared scaled voltage feedback signal.

For example, the processor computes at least one revised operating set point of a higher or lower voltage depending on the needs of the customer, such as a computation of 4000 volts or 1000 volts, like and A-D value of 2000 or 4096.

The processor uses the revised operating set point to simultaneously and automatically regulate high output voltage within all operating set points.

Example 3: Digital High Voltage Power Supply with Metal Case

In an embodiment the digital high voltage power supply is contained in a metal case that is sealed. The digital high voltage power can weigh 2 pounds to 3 pounds.

In the case is a high voltage plant that can be attached to the case, such as with epoxy. The high voltage plant, in this example, receives a low voltage such as 12 Vdc.

The high voltage plant converts the 12 volts to a high voltage signal such as 1000 volts DC containing unwanted sinusoidal noise such as a 6 Vac signal which is like static on a phone call.

The high voltage plant contains a transformer such as transform that converts the 12 volts to the 1000 volts or a voltage step up device can be used which does the same voltage conversion, but differently.

The high voltage plant contains a transistor such as a MOSFET transistor which pulls the low voltage 12 volts current through the transformer and creates a magnetic field that controls the passage of the voltage like a water valve connected to a water pipe.

The high voltage plant contains a high voltage multiplier such as a 6 times multiplier which multiplies the voltage from the transformer to the high voltage signal which is 6 times the transformer voltage. An example of a high voltage plant can be a standard series multiplier made by Dean Technology of Addison, Tex.

In this example, 2 filters are used. A first filter connects to the high voltage plant and the second filter connects to the high voltage plant in series with the first filter.

The second filter forms a high voltage output.

The first filter in this example can be a combination of an inductor, such as a 10 microhenry inductor, and a capacitor such as a 1 microfarad capacitor connected together in parallel to each other with a ground.

The second filter can be a combination of a resistor in series with the first filter and a capacitor connected with a ground. The resistor can be a 10 kilo ohm resistor. The capacitor in the second filter can be a 2 microfarad capacitor.

The high voltage divider is in case and electrically connected between the high voltage signal and produces a scaled voltage feedback signal. The high voltage divider is formed from a plurality of resistors connected in series. The high voltage divider can use different size resistors, such as one 10 Giga-Ohm resistor and one 10 Kilo ohm resistor.

The high voltage divider is configured to receive the high voltage output of 1000 volts and generate a scaled voltage feedback signal of 3 Vdc.

A processor, such as a microprocessor with programmable peripherals, and various hardware features and memory.

The memory for this example contains 4096 operating set points. Some of the step points are a specific voltage or current that the power supply can be set to for operation. Other set points are time intervals, or restart intervals, shut down lengths of time. For example, a specific voltage can be changed from 2000 volts to 5000 volts by entering a user defined value into the memory of the processor.

An example of a time interval set point can be stay on for 5 minutes.

An example of a restart interval can be attempt to restart every one second.

An example of shutdown lengths of time can be stay off for 5 seconds.

The processor is connected to the low voltage and the high voltage plant.

The processor is configured to: receive the scaled voltage feedback signal from the high voltage divider; compare the scaled voltage feedback signal to the plurality of operating set points in memory; compute and store in memory, at least one revised operating set point using the compared scaled voltage feedback signal.

For example, the processor computes at least one revised operating set point of a higher or lower voltage depending on the needs of the customer, such as a computation of 4000 volts or 1000 volts, like and A-D value of 2000 or 4096.

The processor uses the revised operating set point to simultaneously and automatically regulate high output voltage within all operating set points.

While these embodiments have been described with emphasis on the embodiments, it should be understood that within the scope of the appended claims, the embodiments might be practiced other than as specifically described herein.

What is claimed is:
1. A digital high voltage power supply comprising:
 a. a high voltage plant configured to receive a low voltage and generate a high voltage signal containing unwanted sinusoidal noise, the high voltage plant comprising at least one of: a transformer, a transistor, and a high voltage multiplier;
 b. a plurality of filters, wherein at least one filter of the plurality of filters is connected to the high voltage plant, and at least one filter of the plurality of filters forms a high voltage output;
 c. a high voltage divider configured to receive the high voltage output and generate a scaled voltage feedback signal;
 d. a processor with memory containing a plurality of operating set points, the processor connected to the low voltage and the high voltage plant, the processor configured to:
  (i) receive the scaled voltage feedback signal from the high voltage divider;
  (ii) compare the scaled voltage feedback signal to the plurality of operating set points in the memory;
  (iii) compute and store in the memory, at least one revised operating set point using the compared scaled voltage feedback signal; and
  (iv) use the at least one revised operating set point to simultaneously and automatically regulate the high voltage output within all operating set points of the plurality of operating set points.

2. The digital high voltage power supply of claim 1, comprising simultaneously and automatically transmitting an alert through a communication protocol or discrete I/O signals.

3. The digital high voltage power supply of claim 1, comprising a temperature sensor connected to the processor.

4. The digital high voltage power supply of claim 1, wherein the plurality of operating set points is variable based on user defined parameters.

5. The digital high voltage power supply of claim 1, comprising a second feedback loop connected a current to voltage converter providing another feedback signal to the processor.

6. The digital high voltage power supply of claim 1, wherein at least one operating set points of the plurality of operating set points are analog operating set points, digital operating set points or analog and digital operating set points.

7. The digital high voltage power supply of claim 1, comprising a ripple and digital hunting mitigation in the memory.

8. The digital high voltage power supply of claim 1, comprising a second power supply electrically connected between the processor and the high voltage plant.

9. The digital high voltage power supply of claim 8, comprising a voltage divider configured to receive a second voltage output from the high voltage plant, and generate a second scaled voltage feedback signal.

10. The digital high voltage power supply of claim 9, wherein the second power supply comprises: a non-synchronous buck, a non-synchronous boost, a synchronous buck or a synchronous boost.

11. The digital high voltage power supply of claim 1, wherein the alert comprises: a plurality of communication signals all operating simultaneously to convey different commands and data.

12. The digital high voltage power supply of claim 1, comprising a current to voltage converter providing a feedback signal to the processor used to adjust the at least one revised operating set point, and wherein the feedback signal does not exceed one operating set point of the plurality of operating set points stored in the memory.

13. The digital high voltage power supply of claim 1, comprising a first preset value in the memory for adjusting a speed at which the output voltage reaches an operating set point of the plurality of operating set points after output is enabled of the high voltage power supply.

14. The digital high voltage power supply of claim 1, comprising a second preset value in the memory for adjusting a speed at which the output voltage is adjusted due to changing load conditions.

15. The digital high voltage power supply of claim 1, wherein the processor configured to generate an alert when output conditions exceed any operating set points of the plurality of operating set points.

* * * * *

UNITED STATES PATENT AND TRADEMARK OFFICE
CERTIFICATE OF CORRECTION

| | | |
|---|---|---|
| PATENT NO. | : 10,108,210 B1 | Page 1 of 1 |
| APPLICATION NO. | : 15/893135 | |
| DATED | : October 23, 2018 | |
| INVENTOR(S) | : Craig Sean Dean et al. | |

It is certified that error appears in the above-identified patent and that said Letters Patent is hereby corrected as shown below:

On the Title Page

Item (57), should read:
ABSTRACT OF DISCLOSURE
A digital high voltage power supply having a plurality of filters, a high voltage divider, and a processor with memory. The memory contains operating set points. The processor is configured to receive scaled voltage feedback signals from the high voltage divider, compare the scaled voltage feedback signals to the plurality of operating set points in memory, compute and store revised operating set points using the compared scaled voltage feedback signal, use the revised operating set points to simultaneously and automatically regulate output voltage to be within all operating set points, and generate an alert when output conditions exceed any operating set points.

Signed and Sealed this
Eleventh Day of December, 2018

Andrei Iancu
*Director of the United States Patent and Trademark Office*